United States Patent
Kursun et al.

(10) Patent No.: US 11,468,361 B2
(45) Date of Patent: Oct. 11, 2022

(54) REAL-TIME CONVERGENCE ANALYSIS OF MACHINE LEARNING POPULATION OUTPUT IN RAPID CHANGING AND ADVERSARIAL ENVIRONMENTS

(71) Applicant: BANK OF AMERICA CORPORATION, Charlotte, NC (US)

(72) Inventors: Eren Kursun, New York, NY (US); Hylton N. van Zyl, Atlantic Highlands, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 810 days.

(21) Appl. No.: 16/422,384

(22) Filed: May 24, 2019

(65) Prior Publication Data

US 2020/0372403 A1 Nov. 26, 2020

(51) Int. Cl.
*G06N 20/10* (2019.01)
*G06N 20/00* (2019.01)
*G06F 21/57* (2013.01)
*H04L 9/40* (2022.01)

(52) U.S. Cl.
CPC ........... *G06N 20/00* (2019.01); *G06F 21/577* (2013.01); *G06F 2221/033* (2013.01); *H04L 63/1425* (2013.01)

(58) Field of Classification Search
CPC . G06N 20/00; G06F 21/577; G06F 2221/033; H04L 63/1425
See application file for complete search history.

(56) References Cited

U.S. PATENT DOCUMENTS

2018/0060759 A1* 3/2018 Chu ...................... G06N 20/00
2020/0034665 A1* 1/2020 Ghanta .................. G06N 20/00
2020/0193313 A1* 6/2020 Ghanta ............... G06F 16/9038

OTHER PUBLICATIONS

Sayadi, Hossein, et al. "Ensemble learning for effective run-time hardware-based malware detection: A comprehensive analysis and classification." 2018 55th ACM/ESDA/IEEE Design Automation Conference (DAC). IEEE, 2018. https://ieeexplore.ieee.org/stamp/stamp.jsp?tp=&arnumber=8465828 (Year: 2018).

(Continued)

*Primary Examiner* — Paul E Callahan
(74) *Attorney, Agent, or Firm* — Moore & Van Allen PLLC; R. W. McCord Rayburn

(57) ABSTRACT

An artificial intelligence system and method for real-time event trend analysis are provided for a population of machine learning models configured to monitor a real-time data stream. A controller is configured for analyzing the population of machine learning models and determining data trends in response to changes in the real-time data stream; receiving a collective output from the population of machine learning models, wherein the output comprises an analysis of the real-time data stream; extracting an event horizon data trend based on the collective output, the event horizon data trend comprising a determined upcoming data variation in the real-time data stream; and continuously reconfiguring the population of machine learning models based on the collective output and the event horizon data trend.

20 Claims, 6 Drawing Sheets

(56) References Cited

OTHER PUBLICATIONS

Seema, S. "Classification of Evolving Stream Data Using Improved Ensemble Classifier." International Journal of Data Mining & Knowledge Management Process 2.4 (2012): 1. (Year: 2012) https://www.researchgate.net/profile/Seenna-Shedole/publication/269673763 Classification of Evolving Stream Data Using Improved Ensemble Classifier/links/595a07d2458515ea4c64f9dc/.
Jaderberg, Max, et al. "Population based training of neural networks." arXiv preprint arXiv:1711.09846 (2017). https://arxiv.org/abs/ 1711.09846 (Year: 2017).
Signorelli, Mirko, and Ernst Wit. "Model-based clustering for populations of networks." arXiv e-prints (2018): arXiv-1806. https://arxiv.org/abs/1806.00225v1 (Year: 2018).
Such, Felipe Petroski, et al. "Deep neuroevolution: Genetic algorithms are a competitive alternative for training deep neural networks for reinforcement learning." arXiv preprint arXiv: 1712.06567 (2017). https://arxiv.org pdf/1712.06567.pdf (Year: 2017).

\* cited by examiner

REAL-TIME CONVERGENCE ANALYSIS OF MACHINE LEARNING POPULATION OUTPUT IN RAPID CHANGING AND ADVERSARIAL ENVIRONMENTS

BACKGROUND

Modern artificial intelligence and machine learning techniques are applied across a wide range of fields to analyze complex data and output conclusive results. Current system architectures and techniques are typically limited in their dependence on a single powerful machine learning model for decisioning purposes. These limitations reduce the reliability and adaptiveness of current machine learning systems in certain implementations wherein real-time, rapid changes in the data environment can be of particular importance, especially in the case of adversarial scenarios (e.g., cybersecurity, misappropriation detection, autonomous vehicles). Therefore, there exists a need for an improved, collaborative machine learning technology having enhanced reliability and adaptability.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for incremental state-based learning utilizing neural networks. An artificial intelligence system for real-time event trend analysis using a population of machine learning models is provided. The artificial intelligence system comprises a population of machine learning models configured to monitor a real-time data stream; and a controller configured for analyzing the population of machine learning models and determining data trends in response to changes in the real-time data stream, the controller comprising at least one memory device with computer-readable program code stored thereon, at least one communication device connected to a network, and at least one processing device, wherein the at least one processing device is configured to execute the computer-readable program code to: receive a collective output from the population of machine learning models, wherein the output comprises an analysis of the real-time data stream; extract an event horizon data trend based on the collective output, the event horizon data trend comprising a determined upcoming data variation in the real-time data stream; and reconfigure, continuously, the population of machine learning models based on the collective output and the event horizon data trend.

In some embodiments, extracting the event horizon data trend further comprises identifying a convergent output of the population of machine learning models, wherein the convergent output comprises a majority portion of the collective output associated with a number of the population of machine learning models that are in agreement. In some embodiments, the at least one processing device is further configured to execute the computer-readable program code to: determine that the number of the population of machine learning models in agreement is above a predetermined threshold; and in response to determining that the number of the population of the machine learning models in agreement is above a predetermined threshold, reconfigure the population of machine learning models. In some embodiments, reconfiguring the population of machine learning models adjusts the number of the population of machine learning models that are in agreement. In some embodiments, extracting the event horizon data trend further comprises identifying a divergent output of the population of machine learning models, wherein the divergent output comprises a minority portion of the collective output associated with a number of the population of machine learning models. In some embodiments, the at least one processing device is further configured to execute the computer-readable program code to identify a vulnerability of the population of machine learning models based on at least one of the convergent output and the divergent output of the population of the machine learning models.

In some embodiments, reconfiguring the population of the machine learning models comprises retraining the population of machine learning models based on at least one of historical data, real-time data, adversarial data, and synthetically generated data. In some embodiments, the historical data, real-time data, adversarial data, and synthetically generated data comprises misappropriation data and strategies. In some embodiments, reconfiguring the population of machine learning models comprises changing architectural parameters of the population, and wherein the architectural parameters comprise at least one of adding a new model to the population, removing a current model from the population, and reweighting a current model from the population.

In some embodiments, the population of machine learning models are clustered into a plurality of sub-populations, and wherein extracting the event horizon data trend comprises hierarchically evaluating the collective output of at least a portion of the sub-populations.

A computer-implemented method for real-time event trend analysis using a population of machine learning models is provided. The computer-implemented method comprises: providing a population of machine learning models configured to monitor a real-time data stream; and providing a controller configured for analyzing the population of machine learning models and determining data trends in response to changes in the real-time data stream, the controller comprising at least one memory device with computer-readable program code stored thereon, at least one communication device connected to a network, and at least one processing device, wherein the at least one processing device is configured to execute the computer-readable program code to: receive a collective output from the population of machine learning models, wherein the output comprises an analysis of the real-time data stream; extract an event horizon data trend based on the collective output, the event horizon data trend comprising a determined upcoming data variation in the real-time data stream; and reconfigure, continuously, the population of machine learning models based on the collective output and the event horizon data trend.

In some embodiments, extracting the event horizon data trend further comprises identifying a convergent output of the population of machine learning models, wherein the convergent output comprises a majority portion of the collective output associated with a number of the population of machine learning models that are in agreement. In some embodiments, the at least one processing device is further configured to execute the computer-readable program code to: determine that the number of the population of machine learning models in agreement is above a predetermined threshold; and in response to determining that the number of the population of the machine learning models in agreement is above a predetermined threshold, reconfigure the population of machine learning models. In some embodiments, reconfiguring the population of machine learning models adjusts the number of the population of machine learning models in agreement. In some embodiments, extracting the event horizon data trend further comprises identifying a divergent output of the population of machine learning models, wherein the divergent output comprises a minority portion of the collective output associated with a number of the population of machine learning models. In some embodiments, the at least one processing device is further configured to execute the computer-readable program code to identify a vulnerability of the population of machine learning models based on at least one of the convergent output and the divergent output of the population of the machine learning models.

In some embodiments, reconfiguring the population of the machine learning models comprises retraining the population of machine learning models based on at least one of historical data, real-time data, adversarial data, and synthetically generated data. In some embodiments, reconfiguring the population of machine learning models comprises changing architectural parameters of the population, and wherein the architectural parameters comprise at least one of adding a new model to the population, removing a current model from the population, and reweighting a current model from the population.

In some embodiments, the population of machine learning models are clustered into a plurality of sub-populations, and wherein extracting the event horizon data trend comprises hierarchically evaluating the collective output of at least a portion of the sub-populations.

An artificial intelligence system for real-time event trend analysis using a population of machine learning models is provided. The artificial intelligence system comprises: a population of machine learning models clustered into a plurality of hierarchical sub-populations, the population being configured to collectively monitor a real-time data stream; and a controller configured for analyzing the population of machine learning models and determining data trends in response to changes in the real-time data stream, the controller comprising at least one memory device with computer-readable program code stored thereon, at least one communication device connected to a network, and at least one processing device, wherein the at least one processing device is configured to execute the computer-readable program code to: receive a collective output from the population of machine learning models, wherein the output comprises an analysis of the real-time data stream; identify a convergent output of the population of machine learning models, wherein the convergent output comprises a majority portion of the collective output associated with a number of the population of machine learning models that are in agreement; based on the convergent output, extract an event horizon data trend based on the collective output, the event horizon data trend comprising a determined upcoming data variation in the real-time data stream; and reconfigure, continuously, the population of machine learning models based on the convergent output and the event horizon data trend, wherein reconfiguring the population of machine learning models comprises retraining and reconfiguring an architecture of the population of machine learning models.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
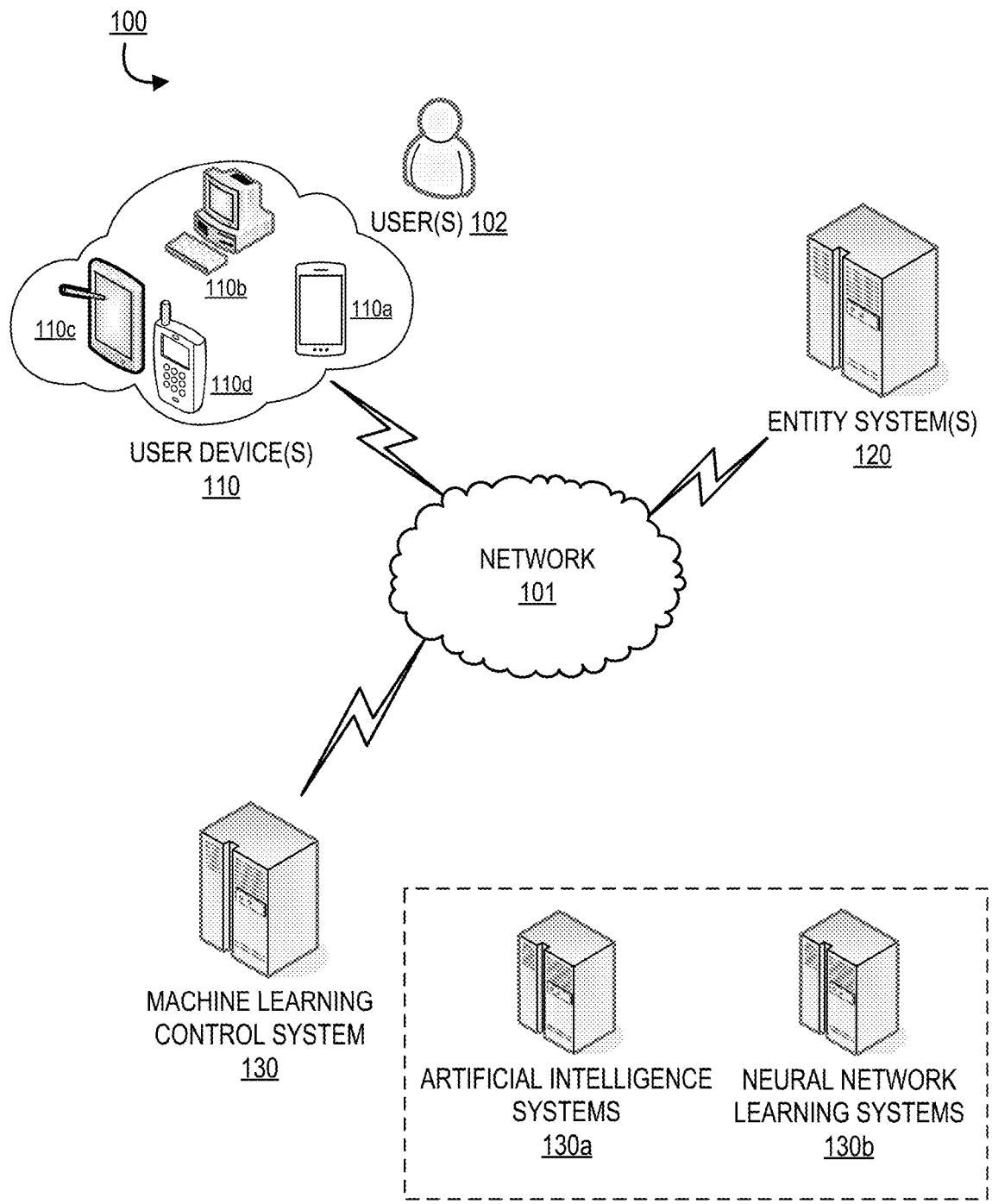
Figure 2:
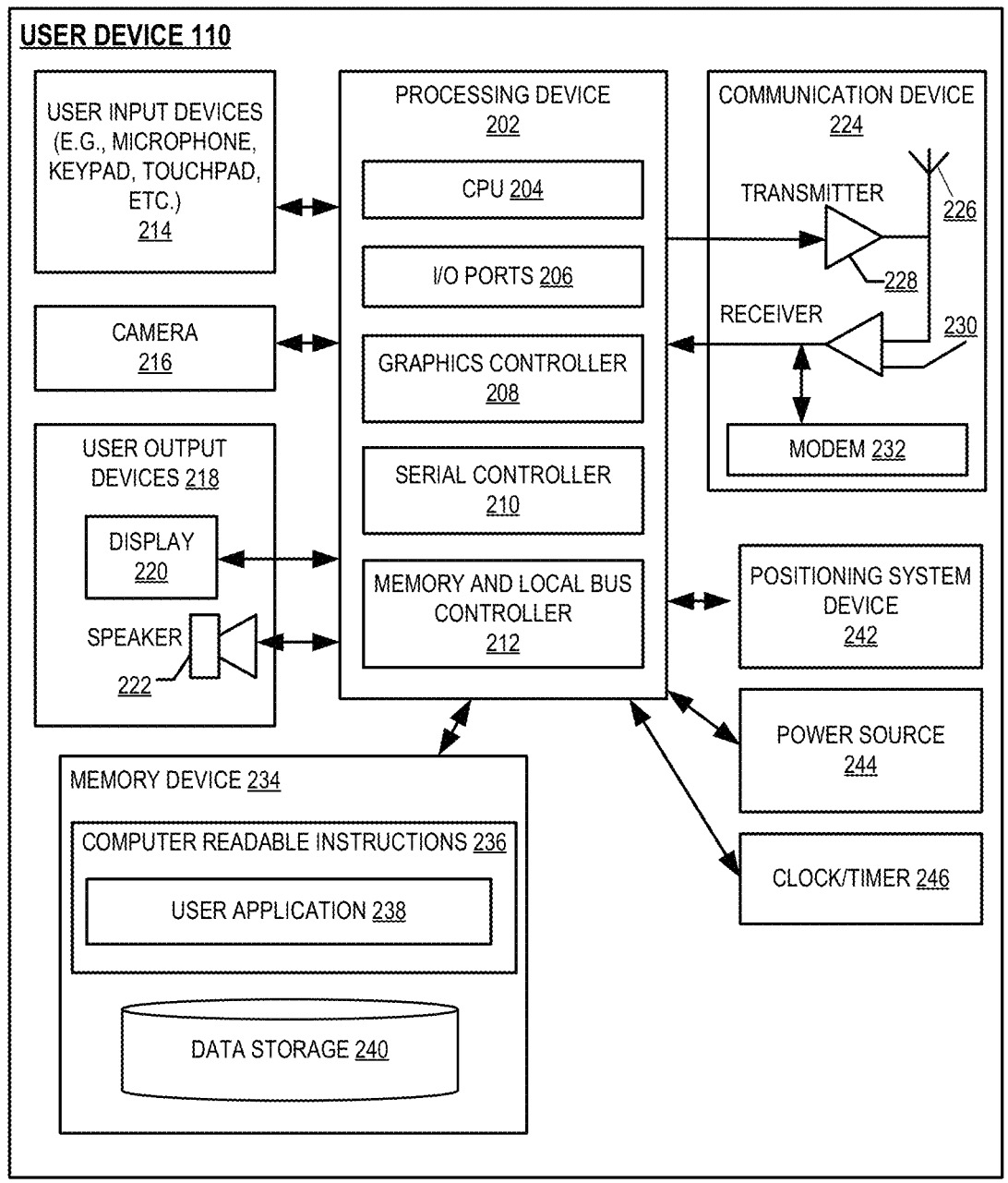
Figure 3:
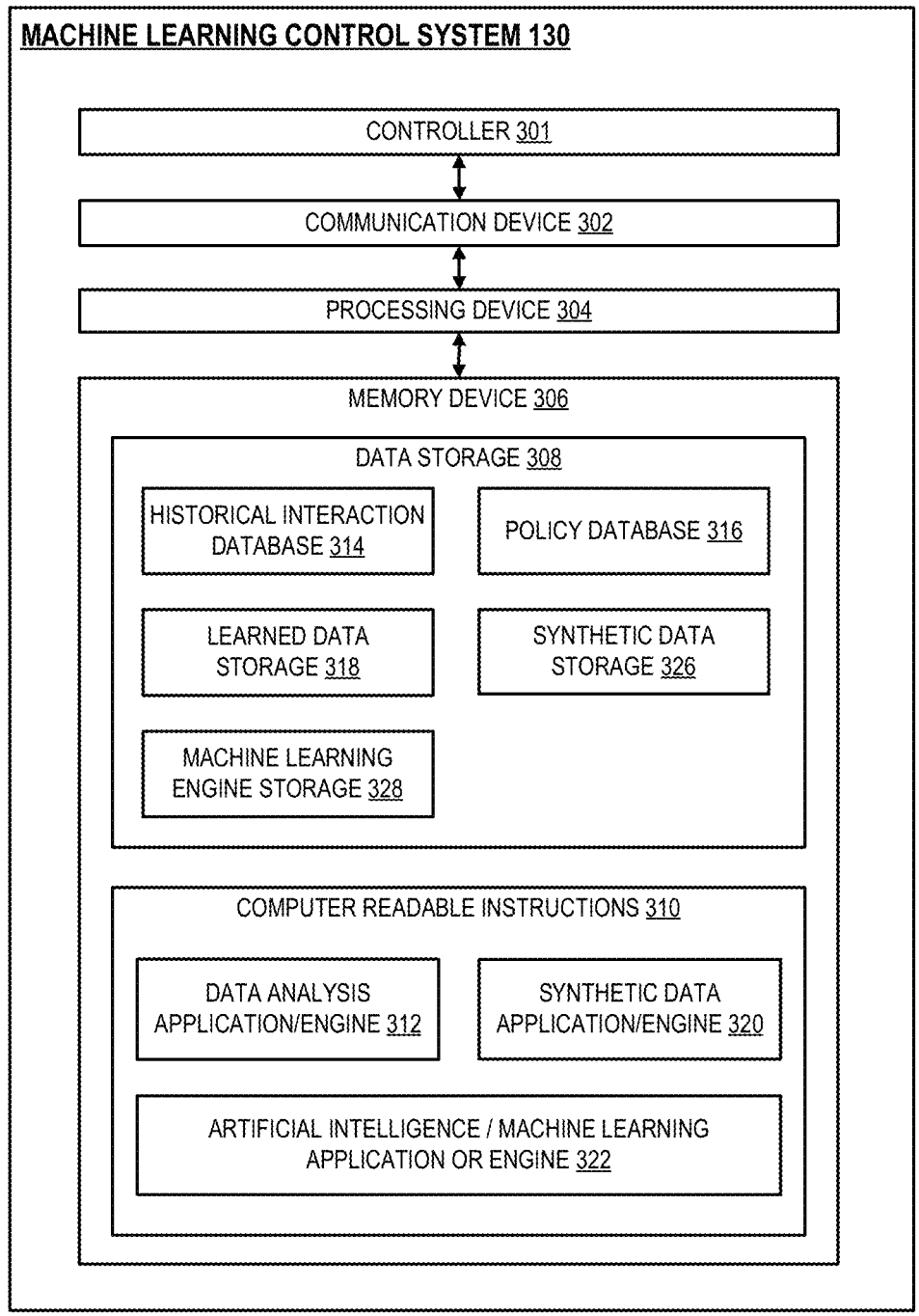
Figure 4:
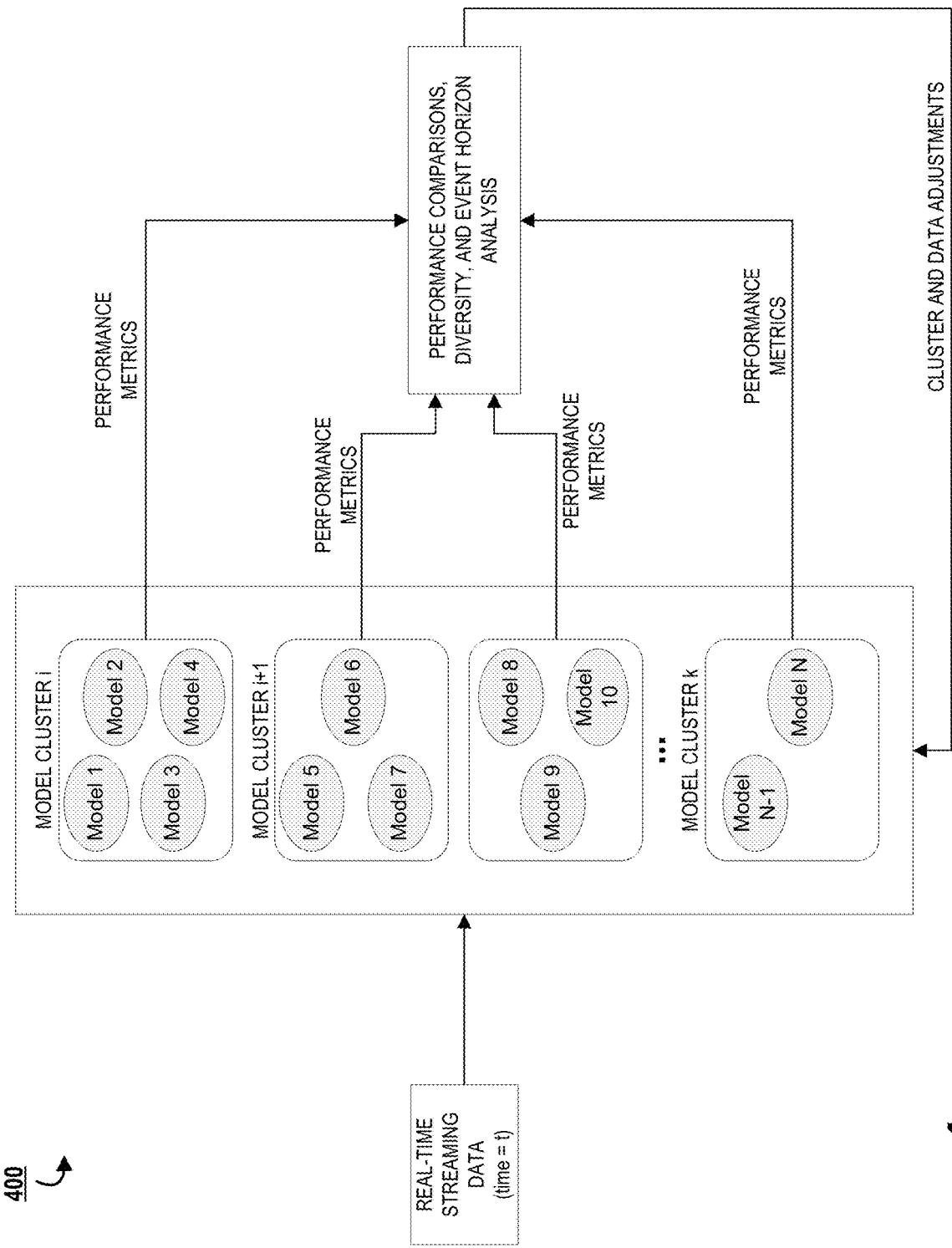
Figure 5:
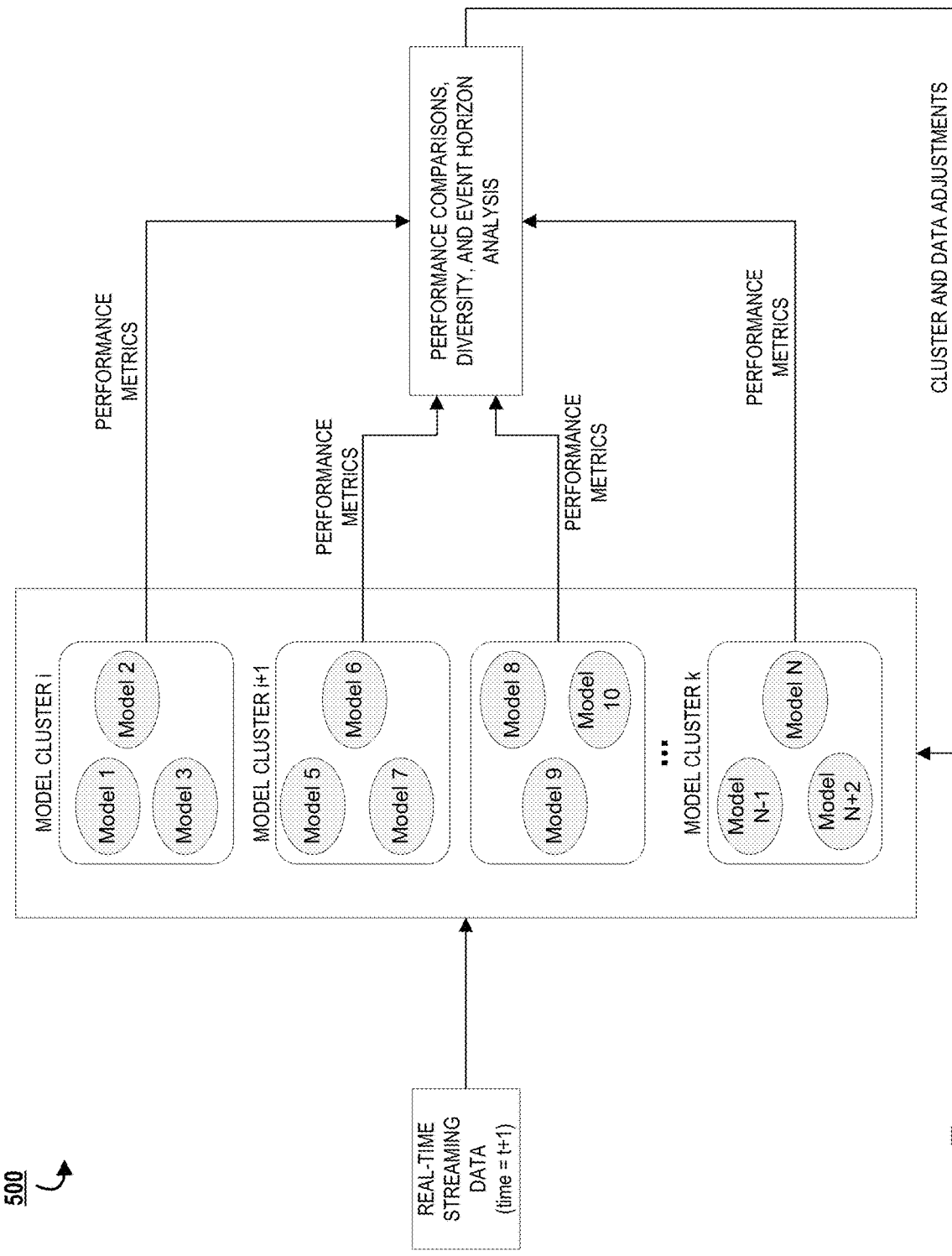
Figure 6:
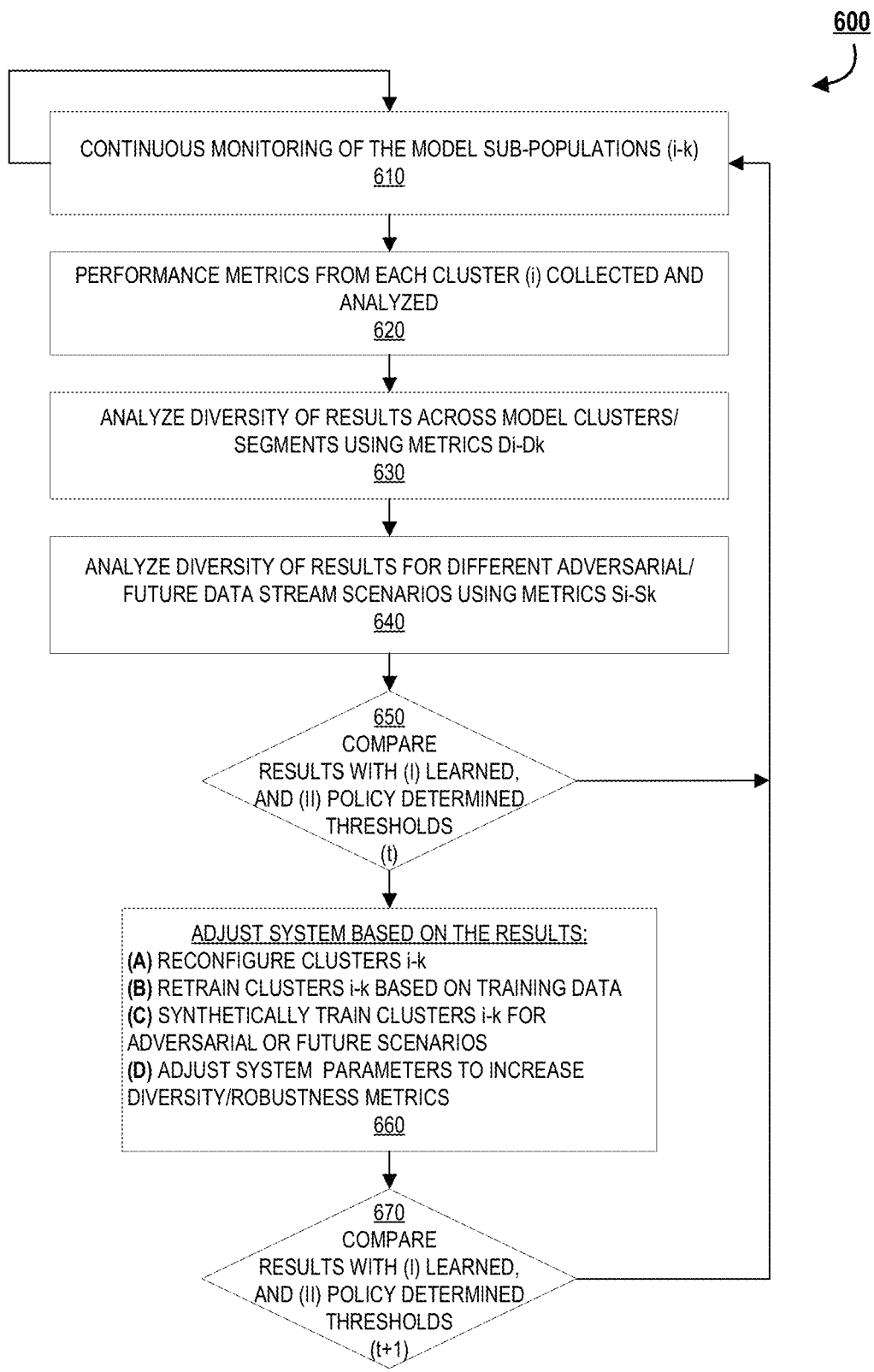

Having thus described embodiments of the invention in general terms, reference will now be made to the accompanying drawings, wherein:

FIG. 1 provides a collaborative machine learning system environment, in accordance with one embodiment of the invention;

FIG. 2 provides a block diagram of a user device, in accordance with one embodiment of the invention;

FIG. 3 provides a block diagram of a machine learning control system, in accordance with one embodiment of the invention;

FIG. 4 provides a high level process map for reconfiguration of a population of collaborative machine learning models, in accordance with one embodiment of the invention;

FIG. 5 provides a high level process map for reconfiguration of a population of collaborative machine learning models, in accordance with one embodiment of the invention; and FIG. 6 provides a high level process flow for analyzing and reconfiguring machine learning models, in accordance with one embodiment of the invention.

DETAILED DESCRIPTION OF EMBODIMENTS OF THE INVENTION

Embodiments of the system, as described herein leverage artificial intelligence, machine-learning, and/or other complex, specific-use computer systems to provide a novel approach for training neural network systems for processing complex data streams in real-time. The system utilizes a collection of machine learning models, either individually or clustered, for processing input from a real-time data stream. The system then analyzes and evaluates the models based on performance metrics of the models which gauge the performance (i.e., accuracy, resource efficiency, reliability, stability), adaptability (i.e., robustness and diversity), and the like of the machine learning models. By providing access to a large pool of diverse AI engines and machine learning models, the system may adapt to changing environmental conditions in a real-time data stream by reconfiguring the population of the models. Furthermore, the machine learning models may be retrained based on the analysis of the entire population to further adapt. The system is also configured to generate synthetic data and inject the data into the real-time data stream. In this way, the system may be further adaptable to unforeseen or adversarial scenarios that may not have been incorporated in initial training of the models. Reconfiguration of the population may further include architectural changes through the addition and/or removal of particular models or model clusters as well as reweighting of models. As the system includes a diverse collection of several machine learning models for decisioning instead of a single model, reliability and stability of the population and/or sub-populations may be increased thereby reducing the need for complete retraining of the models. As such, the present invention provides a technical improvement to artificial intelligence and machine learning technologies.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the collaborative machine learning system. In some embodiments, a user may be a computing device user, a phone user, a mobile device application user, a customer of an entity or business, a system operator, and/or employee of an entity (e.g., a financial institution). In a specific embodiment, a user may be a managing user of a population of machine learning models, wherein the system enables the user to reconfigure the population based on user-specified criteria and policies. In another specific embodiment, a user may be a customer accessing a user account via an associated user device, wherein data from an interaction between the user and an entity is analyzed or processed by the system. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, or any combination of the aforementioned. The device may be used by the user to access the system directly or through an application, online portal, internet browser, virtual private network, or other connection channel.

As used herein, the term "entity" may be used to include any organization or collection of users that may interact with the collaborative machine learning system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing performance of one or more machine learning models or engines using performance metrics associated with one or more of the models.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface (e.g., clicking, swiping, text or data entry, etc.), authentication actions (e.g., signing-in, username and password entry, PIN entry, etc.), account actions (e.g., account access, fund transfers, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity.

FIG. 1 provides a collaborative machine learning system environment 100, in accordance with one embodiment of the invention. As illustrated in FIG. 1, the machine learning control system 130 is operatively coupled, via a network 101, to the user device(s) 110 (e.g., a plurality of user devices 110a-110d) and the entity system 120. In this way, the machine learning control system 130 can send information to and receive information from the user device 110 and the entity system 120. In the illustrated embodiment, the plurality of user devices 110a-110d provide a plurality of communication channels through which the entity system 120 and/or the machine learning control system 130 may communicate with the user 102 over the network 101.

In the illustrated embodiment, the machine learning control system 130 further comprises an artificial intelligence (AI) system 130a and a machine learning system 130b which may be separate systems operating together with the machine learning control system 130 or integrated within the machine learning control system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with the entity system 120 via a user device 110 while a data flow or data stream between the user device 110 and the entity system 120 is monitored by or received by the machine learning control system 130 over the network 101 to be processed or analyzed. In some embodiments a user 102 is a user requesting service from the entity (e.g., customer service) or interacting with an account maintained by the entity system 120. In an alternative embodiment, the user 102 is a user interacting with, maintaining, or employing a population of machine learning models, wherein the system enables the user to reconfigure the population based on user-specified criteria and policies FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In one embodiment, the user is a maintaining entity of a collaborative machine learning control system, wherein the user application enables the user to define policies and reconfigure a population of machine learning models. In one embodiment, the user is a customer of a financial entity and the user application 238 is an online banking application providing access to the entity system 120 wherein the user may interact with a user account via a user interface of the user application 238, wherein the user interactions may be provided in a data stream as an input to one or more machine learning models.

The processing device 202 may be configured to use the communication device 224 to communicate with one or more other devices on a network 101 such as, but not limited to the entity system 120 and the machine learning control system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the machine learning control system 130 and which may be associated with one or more entities, institutions or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the machine learning control system 130 to provide access to one or more user accounts stored and maintained on the entity system 120. In some embodiments, the entity system 120 may communicate with the machine learning control system 130 during an interaction with a user 102 in real-time, wherein user interactions may be monitored and processed by the machine learning control system 130 in order to analyze interactions with the user 102 and reconfigure a population of machine learning models in response to changes in a received or monitored data stream.

FIG. 3 provides a block diagram of a machine learning control system 130, in accordance with one embodiment of the invention. The machine learning control system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the machine learning control system 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the machine learning control system 130 comprises computer-readable instructions 310 stored in the memory device 306, which in one embodiment includes the computer-readable instructions 310 of a data analysis application or engine 312, a synthetic data application or engine 320, and an artificial intelligence application 322 which further comprises a machine learning engine. In one embodiment, the artificial intelligence application 322 and machine learning engine may be utilized by the data analysis application 312 and/or synthetic data application 320 to, respectively, analyze performance metrics of a population of machine learning models and generate synthetic data for injection into the population based on the analysis.

In some embodiments, the memory device 306 includes data storage 308 for storing data related to the system environment, but not limited to data created and/or used by the data analysis application 312, synthetic data application 320, an artificial intelligence application 322, and a machine learning engine such as the historical interaction database 314, policy database 316, learned data storage 318, synthetic data storage 326, and the machine learning engine storage 328.

The historical interaction database 314 is used to store information regarding past interactions (e.g., account actions, transactions, communications, inputs) and/or content of a past data stream. In some embodiments, the historical interaction database 314 may be configured to store data from an incoming data stream in real-time. In some embodiments, the policy database 316 is configured to store pre-determined policies, conditions, rules, thresholds, or the like for evaluating and managing the machine learning control system 130 (e.g., model configurations and adaptations). The policy database 316 my further be configured to store learned policies, conditions, rules, thresholds, or the like as determined in real-time by the machine learning models of the system described herein. In some embodiments, the policy database 316 is further configured to store probability metrics, system performance metrics, cost metrics, benefit metrics, cost-change metrics, adversarial scenarios or data, extrapolated scenarios or data, and the like associated with the machine learning control system 130. In some embodiments, the policy database 316 and/or the historical interaction database 314 include pre-existing training data for training a machine learning or artificial intelligence engine. In some embodiments, the policy database 316 is configured for storing settings associated with the system itself such as energy efficiency settings, computer resource use efficiency settings, response time settings, regulatory guidelines, and the like.

The synthetic data storage 326 is configured to store synthetically generated data generated by the system (i.e., via synthetic data application/engine 320). The synthetic data stored in the synthetic data storage 326 may be used for training a machine learning model or artificial intelligence engine. The synthetic data storage 326 may include adversarial or extrapolated scenarios or data generated by the systems described herein which may be fed back into machine learning models to train the system. In some embodiments, the system 130 may include an adversarial function configured for providing adversarial learning and modeling to the system by introducing unreliable or erroneous data to the system; a learning or adaptation function for defining system response to data changes or an adaptation rate for implementing changes (i.e., model reconfiguration) within an architecture of the systems described herein; and an alertness function and robustness function for defining an appropriate system reaction, response, or extent of system reaction based on one or more environmental conditions or previous interactions.

The machine learning engine storage 328 is configured for storing one or more artificial intelligence engines, machine learning models, or the like. The AI engines and machine learning models described herein may include engines and/or models directed to, for example, cybersecurity, marketing, misappropriation detection, medicine, autonomous deices (e.g., self-driving cars), AI assistants, or the like. In one embodiment, the machine learning engine storage 328 is configured to store a collection of diverse machine learning engines/models to provide the system with a high level of adaptability to constantly changing environments (i.e., changes in a received data stream).

In one embodiment of the invention, the machine learning control system 130 may associate with applications having computer-executable program code that instructs the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the machine learning control system 130 further comprises a dynamic optimization algorithm to be executed by the processing device 304 or a controller 301 for reconfiguring a machine learning model based on, for example, analyzed performance metrics. That said, the algorithm may further include a data pattern of a streamed data source a data output from one or more models, or the like during an assessment of a new model population reconfiguration. The dynamic optimization algorithm may further receive the data stream and identified changes to the data stream in real-time for determining reconfigurations.

Embodiments of the machine learning control system 130 may include multiple systems, servers, computers or the like maintained by one or many entities. In some embodiments, the machine learning control system 130 may be part of the entity system 120. In other embodiments, the entity system 120 is distinct from the machine learning control system 130. The machine learning control system 130 may communicate with the entity system 120 via a secure connection generated for secure encrypted communications between the two systems either over the network 101 or alternative to the network 101.

The present system, such as the machine learning control system 130, utilizes a collection of machine learning models, either individually or clustered, for processing input from a real-time data stream. The system analyzes and evaluates the models based on performance metrics of the models which gauge the performance (i.e., accuracy, resource efficiency, reliability, stability), adaptability (i.e., robustness and diversity), and the like of the machine learning models. By providing access to a large pool of diverse AI engines and machine learning models, the system may adapt to changing environmental conditions in a real-time data stream by reconfiguring the population of the models. Furthermore, the machine learning models may be retrained based on the analysis of the entire population to further adapt. The system is also configured to generate synthetic data and inject the data into the real-time data stream. In this way, the system may be further adaptable to unforeseen or adversarial scenarios that may not have been incorporated in initial training of the models. Reconfiguration of the population may further include architectural changes through the addition and/or removal of particular models or model clusters as well as reweighting of models.

FIGS. 4 and 5 provide high level process maps for reconfiguration of a population of collaborative machine learning models, in accordance with one embodiment of the invention. FIG. 4 illustrates a process map at a first time, t, wherein real-time streaming data is input into a population of machine learning models. The system, such as the machine learning control system 130, is configured to monitor the data stream received by the system. In some embodiments, data is continuously monitored and/or collected in real-time as interactions occur. In this way, the system may learn and be reconfigured dynamically to account for even small data sources or subtle changes to the received data stream.

In one embodiment, the system is configured to receive data for decisioning, wherein the received data is processed and analyzed by the machine learning models to determine a conclusion. Non-limiting examples of applications in which the system described herein may be incorporated include cybersecurity, marketing, misappropriation detection, medicine, autonomous device (e.g., self-driving cars), AI assistants, and the like. In some embodiments, interactions performed between the user device(s) 110 and the entity system 120 are intercepted and received by the machine learning control system 130, wherein interaction data may be extracted from an interaction over the network 101 by the machine learning control system 130 for decisioning. Data monitored and/or extracted by the system may include, in a non-limiting example, user identifying information, communication history, transaction history, and the like. Data, such as user interaction data, may be acquired from across communication channels of an entity such as phone lines, text messaging systems, email, applications (e.g., mobile applications), websites, ATMs, card readers, call centers, electronic assistants, instant messaging systems, interactive voice response (IVR) systems, brick-and-mortar locations and the like.

Data, such as the previously discussed interaction data, is received by the system (e.g., machine learning control system 130) through a data stream transmitted over a network (e.g., network 101). As previously discussed, the data stream may include both stored historical data as well as new data received and processed by the system in real-time. Real-time data may be data collected and analyzed by the system and used for learning and decisioning. In some embodiments, the historical data includes predetermined training data (e.g., actual or synthetic) used to at least initially pre-train the system with representative data for a desired output. In other embodiments, the predetermined data may be relied upon solely to acquire a predictable output. As will be discussed, the system may utilize the real-time data and the historical data either alone or in combination in addition to synthetic data for learning and decisioning.

In non-limiting embodiments, the data stream includes such as system hardware information (e.g., hardware energy usage) or other non-financial authentication information data (e.g., cybersecurity). In still other embodiments, the data stream may contain data collected by a security system for detecting intrusion (e.g., video monitoring, motion detecting, or the like). In other non-limiting examples of data monitored within the data stream include information regarding past, current, or scheduled transactions or other financial data associated with the user.

Transaction information may include transaction amounts, payor and/or payee information, transaction dates and times, transaction locations, transaction frequencies, and the like. In some embodiments, data may include information regarding account usage. For example, the data stream may include information regarding usage of a credit or debit card account such as locations or time periods where the card was used. In another example, the data may further include merchants with whom the user frequently interacts.

In some embodiments, the data stream may contain information regarding characteristics of the data itself which may be monitored by the system. For example, the data stream may contain information regarding the quality of the data (e.g., file size, bit rate of stream), the fidelity of the data (i.e., data accuracy), mutability of the data stream (i.e., how quickly a data pattern in the data stream changes).

The system receives the streaming data where the data is then analyzed and processed by one or more machine learning models for decisioning purposes. Machine learning models, individually and/or structured as clusters, may be trained based on predetermined training data and/or new data acquired in real-time (i.e., from the data stream), wherein the system learns from the data by dynamically identifying patterns as the information is received and processed. In some embodiments of the present invention, a population of collaborative machine learning models may be adaptive, wherein the structure of the population may be reconfigured based on different environmental conditions and/or an analysis and evaluation of the individual model performance. The population may be modified by the system by having one or more individual models and/or clusters added, removed, made inactive, or the like. In another example, the system may weight particular the conclusions of particular models and/or clusters more than others. Population architecture refers to a collection and particular arrangement of active machine learning models and/or clusters of machine learning models that are configured to process information mathematically or computationally to make decisions. Particular models and/or clusters may be weighted by the system to emphasize the impact or contribution of the particular models and/or clusters over others.

As illustrated in FIG. 4, a population of machine learning models, 1-N, are arranged in a series of model clusters, i-k. Clustered models may be configured for unsupervised learning, wherein unsorted data input from the data stream is grouped in the various clusters based on intrinsic similarities, differences, and patterns of the data. In this way, the population of models determines groupings in real-time, wherein the groups may be assigned to specific clusters and/or models within clusters. The result of groupings may be evaluated by the system described herein according to learned and/or predetermined policies. Non-limiting examples of clustering methods executed by the system may include density-based models, hierarchical-based models, partitioning methods, grid-based methods, as well as clustering algorithms. In other embodiments, the models may employ supervised learning techniques based on trained data alone or in combination with unsupervised techniques.

The system is configured to analyze each of the clusters and/or individual machine learning models by extracting performance metrics for each of the clusters and/or individual machine learning models and comparing the performance metrics to one or more predetermined policies, thresholds or the like for evaluating, for example, performance (i.e., accuracy, resource efficiency, reliability, stability), adaptability (i.e., robustness and diversity). In the illustrated embodiment of the figures, the model population is evaluated hierarchically over smaller groups and within the clusters. In some embodiments, policies and thresholds may be learned and developed through iterative processing of data through the data models.

In some embodiments, an output result or decision of one or more of the models (i.e., individual or collective output) may also be evaluated. Output of one or more models and/or clusters may be evaluated for convergent and/or divergent results to evaluate model diversity or the ability of the population of machine learning models to adapt to changing, unknown, unexpected, or adversarial data (e.g., potential exposure or system vulnerabilities). A convergent output may comprise a majority portion of a collective output associated with a number of the machine learning models that are in agreement, whereas a divergent output may comprise a number of minority portion of the collective output that may further comprise one or more other outputs that are not in agreement with the majority portion. In one example, convergence of a majority of the data models (e.g., exceeding a predetermined threshold value) may indicate a potential vulnerability to a particular adversarial scenario or attack whereby a majority consensus may be potentially susceptible to poisoning by adversarial data. In some embodiments, a convergent and/or divergent output of one or more of the machine learning models may be input back into the data stream to further train the system.

In response to the analyzed performance metrics in light of the defined policies, the system is further configured to reconfigure the population of machine learning models and/or clusters to correct for user and/or system defined performance, adaptability, and adversarial objectives for the system. In non-limiting examples which are discussed further herein, reconfiguring the individual models and/or cluster segments may include retraining, changing architectural parameters, and readjusting target scenarios based on recent historical and/or streaming data and adversarial scenarios. In a specific example, the models my be trained to with adversarial data in response to identifying a vulnerability of exposure of the system in the convergence analysis.

As illustrated in FIG. 4, model and/or cluster and data adjustments or reconfigurations are input back into the population of models along with the continued input of the data stream. As in some embodiments, the system is configured to learn incrementally over time through continuous monitoring and analysis of the incoming data stream and machine learning models themselves, the process map of FIG. 4 becomes the process map of FIG. 5 at time, t+1, which incorporates the adjustments determined at time t. As illustrated in FIG. 5, in response to the performance analysis, the system reconfigured the population of machine learning models. For example, in the embodiment of FIG. 5, the system removed MODEL 4 from MODEL CLUSTER i and added MODEL N+2 to MODEL CLUSTER k.

FIG. 6 provides a high level process flow for analyzing and reconfiguring machine learning models 600, in accordance with one embodiment of the invention. As illustrated in block 610, the system continuously monitors the machine learning models and/or model sub-populations (i.e., clusters). As previously discussed, at block 620 the system collects and analyzes performance metrics or key performance indicators for each of the models and/or clusters to evaluate performance. Diversity or adaptability of the machine learning models to various changes in incoming data and scenarios (e.g., adversarial scenarios) may be analyzed to ensure desired performance objectives. In the illustrated embodiment, at block 630, the system analyzes diversity of segment results using metrics, Di-Dk, for all model clusters or segments, i-k, (as illustrated in FIGS. 4 and 5). At block 650, the system compares performance metrics to learned and/or predetermined policy thresholds to evaluate the models. In one example, the thresholds are a predetermined or learned limit value, wherein the metric may be compared to the threshold value. For example, if the diversity metric for an individual cluster may fall below a threshold, wherein there is strong agreement between the models. In another example, the system may evaluate metrics over a period of time. For example, the system may determine that a number of models being in agreement over a particular period of time does not meet diversity performance objectives and reconfigure the population as a result. In the illustrated embodiment, the system is further configured for analyzing diversity of segment result metrics, Si-Sk, for all model clusters or segments, i-k, with respect to adversarial scenarios and data as well as "event horizon" scenarios or trends in the data extrapolated by the system from the real-time data stream and/or historical data which are also compared to policies and thresholds. So called event horizon data trends are upcoming or expected variations or trends in the real-time data stream as determined by the population of machine learning models, wherein the expected data is extrapolated based on the training and output of the machine learning models. In one example, an upcoming data trend or scenario may be determined at least in part on a convergent and/or divergent output of the machine learning models, wherein the system is configured to learn from previous scenarios for predictive decisioning. Non-limiting examples of adversarial data may include known known misappropriation scenarios and data. In another example adversarial scenarios and data may include collision or traffic adherence data associated with autonomous or self-driving cars (i.e., proper vehicle operation in response to road conditions).

As illustrated in block 660 and as previously discussed, the system is configured to reconfigure or adjust the population of the machine learning models and/or segments in response to or based on the analysis of the performance metrics in order to correct for performance objectives (e.g., accuracy, robustness, adaptability/diversity, adversarial, or the like). In one embodiment, reconfiguring the population comprises providing additional training to the models and/or segments based on the analyzed resultant output. For example, an output determined to be accurate may be input back into a model and/or segment to further train the model and/or segment with regards to the accurate result. In another embodiment reconfiguring the population may comprise continuing to train the models and/or segments with the real-time data stream and/or historical data, wherein the models continue to adapt and learn.

In some embodiments, reconfiguring the population of machine learning models may include changing architectural parameters of the population. For example, the system is configured to add a new model and/or segment to the population, remove a current model and/or segment from the population, reweigh outputs of models and/or segments, and the like.

In some embodiments, the system is configured to generate and inject synthetic data or information into the population of machine learning models to enhance learning and reconfigure the population. In one embodiment, the system is configured to inject synthetic data into the population similar to the input data stream, wherein the injected synthetic data may enhance the real-time data. Synthetic data may include data and/or scenarios not experienced in the historical data storage or the real-time data stream. For example, the injected synthetic data may be intentionally injected with synthetically generated adversarial data to train the models to recognize potentially adversarial scenarios accurately and reliably. Potentially, without the synthetic data injection, the models have a reduced ability to recognize unknown or unfamiliar data in a rapidly changing environment. In another embodiment, the system is configured to inject or input an entire synthetically generated machine learning model and/or cluster into the population, wherein the synthetic model and/or cluster is synthetically trained with data not typically experienced in the real-time data stream. In both of these embodiments, the synthetically generated and injected data is then processed fed or input back into the population to enhance adaptability and reliability of the whole system. The analysis and learning process is performed incrementally and continuously over time. As illustrated in block 670, the reconfigured population is again analyzed and compared to policies and thresholds for evaluation, and further, outputs of the analyses are fed back into the population again at block 610, wherein the continuous monitoring resumes. As the system includes a diverse collection of several machine learning models for decisioning instead of a single model, reliability and stability of the population and/or sub-populations may be increased thereby reducing the need for complete retraining of the models.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with collaborative machine learning and population reconfiguration.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/422,380 | POPULATION DIVERSITY BASED LEARNING IN ADVERSARIAL AND RAPID CHANGING ENVIRONMENTS | May 24, 2019 |

What is claimed is:

1. An artificial intelligence system for real-time event trend analysis using a population of machine learning models, the artificial intelligence system comprising:

a population of machine learning models clustered into a plurality of hierarchical sub-populations, the population being configured to monitor a real-time data stream; and a controller configured for analyzing the population of machine learning models and determining data trends in response to changes in the real-time data stream, the controller comprising at least one memory device with computer-readable program code stored thereon, at least one communication device connected to a network, and at least one processing device, wherein the at least one processing device is configured to execute the computer-readable program code to:

receive a collective output from the population of machine learning models, wherein the collective output comprises an analysis of the real-time data stream;

extract an event horizon data trend based on the collective output, the event horizon data trend comprising a determined upcoming data variation in the real-time data stream, wherein extracting the event horizon data trend comprises hierarchically evaluating the collective output of at least a portion of the sub-populations; and reconfigure, continuously, the population of machine learning models based on the collective output and the event horizon data trend.

2. The artificial intelligence system of claim 1, wherein extracting the event horizon data trend further comprises identifying a convergent output of the population of machine learning models, wherein the convergent output comprises a majority portion of the collective output associated with a number of the population of machine learning models that are in agreement.

3. The artificial intelligence system of claim 2, wherein the at least one processing device is further configured to execute the computer-readable program code to:

determine that the number of the population of machine learning models in agreement is above a predetermined threshold; and in response to determining that the number of the population of the machine learning models in agreement is above the predetermined threshold, reconfigure the population of machine learning models.

4. The artificial intelligence system of claim 3, wherein reconfiguring the population of machine learning models adjusts the number of the population of machine learning models that are in agreement.

5. The artificial intelligence system of claim 2, wherein extracting the event horizon data trend further comprises identifying a divergent output of the population of machine learning models, wherein the divergent output comprises a minority portion of the collective output associated with another number of the population of machine learning models.

6. The artificial intelligence system of claim 5, wherein the at least one processing device is further configured to execute the computer-readable program code to identify a vulnerability of the population of machine learning models based on at least one of the convergent output and the divergent output of the population of the machine learning models.

7. The artificial intelligence system of claim 1, wherein reconfiguring the population of the machine learning models comprises retraining the population of machine learning models based on at least one of historical data, real-time data, adversarial data, and synthetically generated data.

8. The artificial intelligence system of claim 7, wherein the at least one of the historical data, the real-time data, the adversarial data, and the synthetically generated data comprises misappropriation data and strategies.

9. The artificial intelligence system of claim 1, wherein reconfiguring the population of machine learning models comprises changing architectural parameters of the population, and wherein the architectural parameters comprise at least one of adding a new model to the population, removing a current model from the population, and reweighting a current model from the population.

10. A computer-implemented method for real-time event trend analysis using a population of machine learning models, the computer-implemented method comprising:

providing a population of machine learning models clustered into a plurality of hierarchical sub-populations, the population being configured to monitor a real-time data stream; and providing a controller configured for analyzing the population of machine learning models and determining data trends in response to changes in the real-time data stream, the controller comprising at least one memory device with computer-readable program code stored thereon, at least one communication device connected to a network, and at least one processing device, wherein the at least one processing device is configured to execute the computer-readable program code to:

receive a collective output from the population of machine learning models, wherein the collective output comprises an analysis of the real-time data stream;

extract an event horizon data trend based on the collective output, the event horizon data trend comprising a determined upcoming data variation in the real-time data stream, wherein extracting the event horizon data trend comprises hierarchically evaluating the collective output of at least a portion of the sub-populations; and reconfigure, continuously, the population of machine learning models based on the collective output and the event horizon data trend.

11. The computer-implemented method of claim 10, wherein extracting the event horizon data trend further comprises identifying a convergent output of the population of machine learning models, wherein the convergent output comprises a majority portion of the collective output associated with a number of the population of machine learning models that are in agreement.

12. The computer-implemented method of claim 11, wherein the at least one processing device is further configured to execute the computer-readable program code to:

determine that the number of the population of machine learning models in agreement is above a predetermined threshold; and in response to determining that the number of the population of the machine learning models in agreement is above the predetermined threshold, reconfigure the population of machine learning models.

13. The computer-implemented method of claim 12, wherein reconfiguring the population of machine learning models adjusts the number of the population of machine learning models in agreement.

14. The computer-implemented method of claim 11, wherein extracting the event horizon data trend further comprises identifying a divergent output of the population of machine learning models, wherein the divergent output comprises a minority portion of the collective output associated with another number of the population of machine learning models.

15. The computer-implemented method of claim 14, wherein the at least one processing device is further configured to execute the computer-readable program code to identify a vulnerability of the population of machine learning models based on at least one of the convergent output and the divergent output of the population of the machine learning models.

16. The computer-implemented method of claim 10, wherein reconfiguring the population of the machine learning models comprises retraining the population of machine learning models based on at least one of historical data, real-time data, adversarial data, and synthetically generated data.

17. The computer-implemented method of claim 10, wherein reconfiguring the population of machine learning models comprises changing architectural parameters of the population, and wherein the architectural parameters comprise at least one of adding a new model to the population, removing a current model from the population, and reweighting a current model from the population.

18. An artificial intelligence system for real-time event trend analysis using a population of machine learning models, the artificial intelligence system comprising:
- a population of machine learning models clustered into a plurality of hierarchical sub-populations, the population being configured to collectively monitor a real-time data stream; and
- a controller configured for analyzing the population of machine learning models and determining data trends in response to changes in the real-time data stream, the controller comprising at least one memory device with computer-readable program code stored thereon, at least one communication device connected to a network, and at least one processing device, wherein the at least one processing device is configured to execute the computer-readable program code to:
    - receive a collective output from the population of machine learning models, wherein the collective output comprises an analysis of the real-time data stream;
    - identify a convergent output of the population of machine learning models, wherein the convergent output comprises a majority portion of the collective output associated with a number of the population of machine learning models that are in agreement;
    - based on the convergent output, extract an event horizon data trend based on the collective output, the event horizon data trend comprising a determined upcoming data variation in the real-time data stream; and
    - reconfigure, continuously, the population of machine learning models based on the convergent output and the event horizon data trend, wherein reconfiguring the population of machine learning models comprises retraining and reconfiguring an architecture of the population of machine learning models.

19. The artificial intelligence system of claim of claim 18, wherein:
- extracting the event horizon data trend further comprises identifying a convergent output of the population of machine learning models, wherein the convergent output comprises a majority portion of the collective output associated with a number of the population of machine learning models that are in agreement; and
- the at least one processing device is further configured to execute the computer-readable program code to:
    - determine that the number of the population of machine learning models in agreement is above a predetermined threshold; and
    - in response to determining that the number of the population of the machine learning models in agreement is above the predetermined threshold, reconfigure the population of machine learning models.

20. The artificial intelligence system of claim of claim 19, wherein extracting the event horizon data trend further comprises identifying a divergent output of the population of machine learning models, wherein the divergent output comprises a minority portion of the collective output associated with another number of the population of machine learning models.

* * * * *